United States Patent
Anvret et al.

(10) Patent No.: US 6,466,657 B1
(45) Date of Patent: Oct. 15, 2002

(54) ARRANGEMENT FOR ACQUISITION OF SERVICES VIA A TELEPHONE SET

(75) Inventors: Lena Anvret, Upplands Väsby (SE); Laszlo Mersich, Madrid (ES)

(73) Assignee: Telia AB, Farsta (SE)

( * ) Notice: Subject to any disclaimer, the term of this patent is extended or adjusted under 35 U.S.C. 154(b) by 0 days.

(21) Appl. No.: 08/330,216

(22) Filed: Oct. 27, 1994

Related U.S. Application Data

(63) Continuation of application No. 07/961,706, filed on Jan. 11, 1993, and a continuation of application No. PCT/SE92/00293, filed on May 6, 1992.

(30) Foreign Application Priority Data

May 10, 1991 (SE) .............................................. 9101408

(51) Int. Cl.⁷ .............................................. H04M 11/00
(52) U.S. Cl. ................................ 379/93.12; 379/91.01; 379/102.01
(58) Field of Search ................................ 379/90, 91, 93, 379/95, 96, 97, 98, 142, 144, 357, 356, 93.12, 91.01, 90.01, 93.02, 102.01, 102.02; 902/26; 235/379, 380

(56) References Cited

U.S. PATENT DOCUMENTS

| | | | | |
|---|---|---|---|---|
| 4,360,875 A | * | 11/1982 | Behnke | 379/95 |
| 4,595,983 A | * | 6/1986 | Gehalo et al. | 379/144 |
| 4,682,017 A | | 7/1987 | Nakahara et al. | |
| 4,692,604 A | | 9/1987 | Billings | |
| 4,701,601 A | | 10/1987 | Francini | |
| 4,707,592 A | * | 11/1987 | Wave | 379/91 |
| 4,750,201 A | * | 6/1988 | Hodgson et al. | 379/91 |
| 4,759,056 A | * | 7/1988 | Akiyama | 379/144 |
| 4,766,293 A | | 8/1988 | Boston | |
| 4,788,420 A | * | 11/1988 | Chang et al. | 379/91 |
| 4,795,898 A | | 1/1989 | Bernstein et al. | |
| 4,817,136 A | * | 3/1989 | Rhoads | 379/357 |
| 4,868,373 A | | 9/1989 | Opheij et al. | |
| 4,874,935 A | | 10/1989 | Younger | |
| 4,879,645 A | * | 11/1989 | Tamada et al. | 235/380 |
| 4,882,474 A | * | 11/1989 | Anderl et al. | 235/380 |
| 4,916,731 A | * | 4/1990 | Brisson | 379/96 |
| 4,983,816 A | | 1/1991 | Iijima | |
| 5,036,461 A | * | 7/1991 | Elliott et al. | 235/380 |
| 5,119,414 A | * | 6/1992 | Izumi | 379/357 |
| 5,163,086 A | * | 11/1992 | Ahearn et al. | 379/91 |
| 5,220,501 A | * | 6/1993 | Lawlor et al. | 379/90 |
| 5,221,838 A | * | 6/1993 | Gutman et al. | 235/379 |
| 5,266,782 A | * | 11/1993 | Alanara et al. | 379/91 |
| 5,367,150 A | * | 11/1994 | Kitta et al. | 235/379 |

FOREIGN PATENT DOCUMENTS

| | | |
|---|---|---|
| EP | 0 379 333 | 7/1990 |
| GB | 1 396 150 | 6/1975 |

* cited by examiner

*Primary Examiner*—Stella Woo
(74) *Attorney, Agent, or Firm*—Oblon, Spivak, McClelland, Maier & Neustadt, P.C.

(57) ABSTRACT

The invention relates to an arrangement for acquisition of services via a telephone set. The arrangement comprises a communication element which connects the calling service purchaser to a service provider station with associated computer equipment. The arrangement contains a reader unit which operates in conjunction with an identity element for communicating with the computer equipment. The identity element is provided with information for identifying the purchaser. The identity element is preferably a smart card and the communication element comprises a reader unit which, together with software, can handle smart cards. The arrangement has a built-in keyboard for feeding in data.

23 Claims, 3 Drawing Sheets

US 6,466,657 B1

ARRANGEMENT FOR ACQUISITION OF SERVICES VIA A TELEPHONE SET

Figure 1:
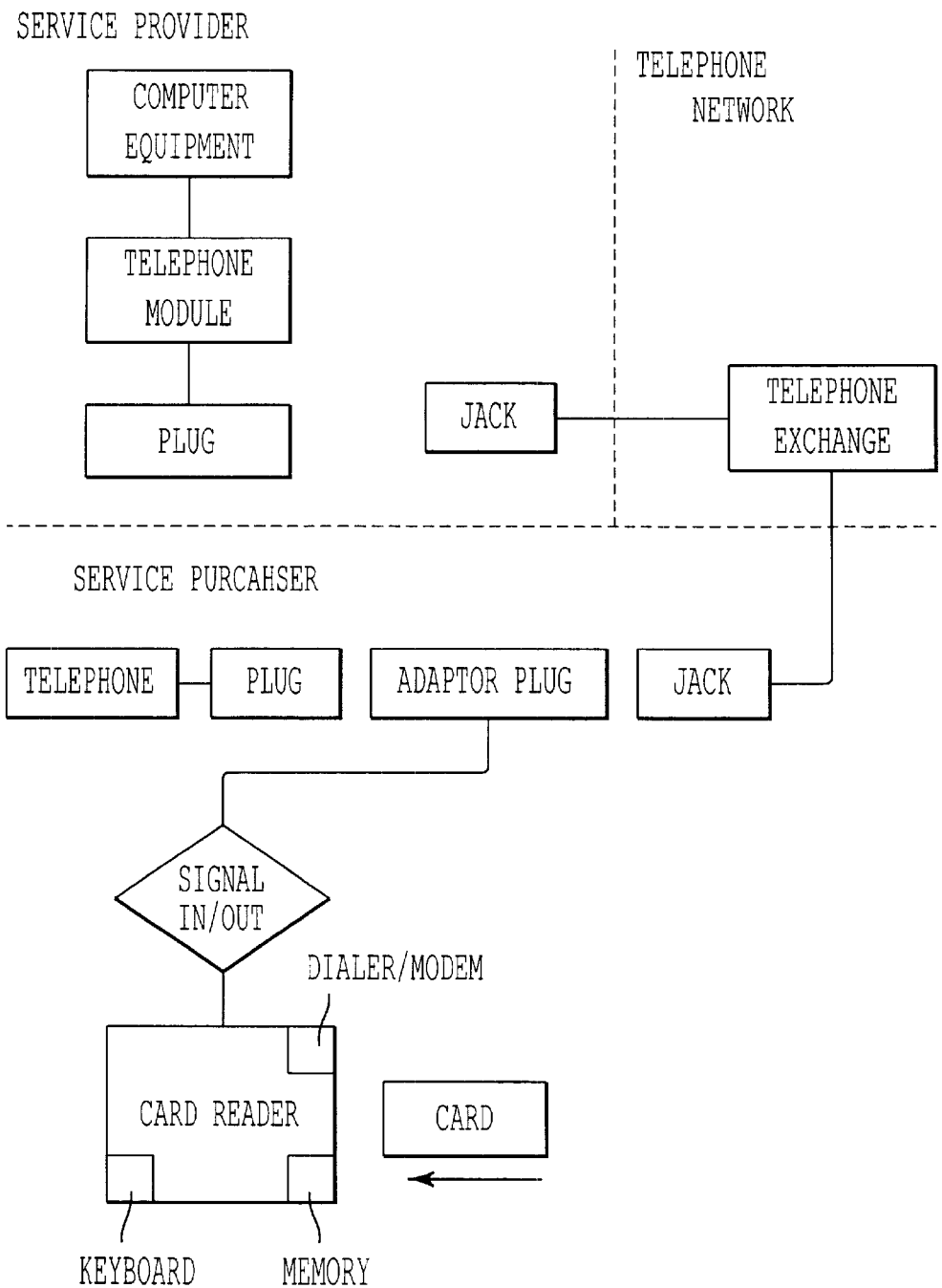

This application is a Continuation of application Ser. No. 07/961,706, filed on Jan. 11, 1993, now abandoned and PCT/SE92/00293 filed May 6, 1992.

FIELD OF THE INVENTION

The present invention relates to an arrangement for acquisition of services via a telephone set, more specifically a reader which is coupled to the telephone. The reader contains a reader unit which, together with software, can handle smart cards. The reader can communicate with a receiver at the service provider end. The arrangement has a built-in keyboard for feeding in data.

The arrangement is controlled in its entirety from the telephone service which the service purchaser is ringing. This can be a voice answering equipment or any other equipment which is built for communicating with a reader for smart cards. The reader is controlled via any one of the two accessible communication channels.

PRIOR ART

It has previously been known to order services from a computer equipment via telephone. In this case, the computer is controlled with the aid of the key set on the telephone set and information is obtained from the computer in the form of speech which is generated by the computer. The user himself must keep track of all codes for identification and different instructions to the computer.

Automatic banking machines are also already known. In these, a card is introduced which identifies the user. The user then requests an amount and feeds in his personal identification code via the key set on the terminal. The automatic banking machines only provide limited services, withdrawal and account information, and the bank card only contains a code which identifies the account.

SUMMARY OF THE INVENTION

The present invention relates to an arrangement for the acquisition of services via a telephone set with increased possibilities. Several different services can be provided and the safety functions can be improved.

According to the invention, the arrangement comprises a communication element which couples the calling service purchaser to a service provider station with associated computer equipment. The communication element operates in conjunction with an identity element, preferably a smart card, for communicating with the computer equipment. The identity element is provided with information for identifying the service purchaser, among others.

Other embodiments of the invention are specified in greater detail in the subsequent patent claims. Service providers can increase the security of the existing applications or develop new services with the aid of the reader. Security is guaranteed by the security functions which are built into smart cards. Among other things, these cards can encrypt and sign electronic transactions which, together, have the result that service providers can offer very advanced services via the telephone network. A smart card which is used as information carrier can use the reader for transmitting the stored information items.

SHORT DESCRIPTION OF THE DRAWINGS

Figure 2:
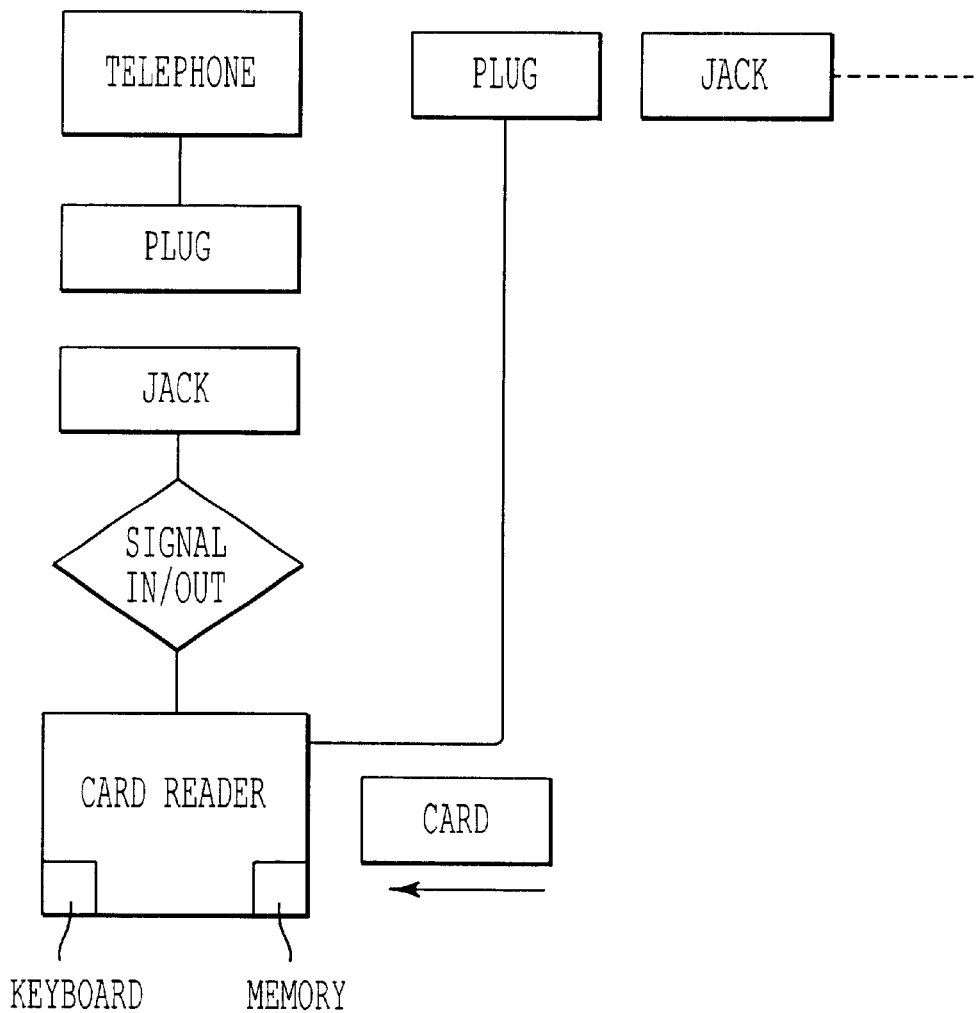
Figure 3:
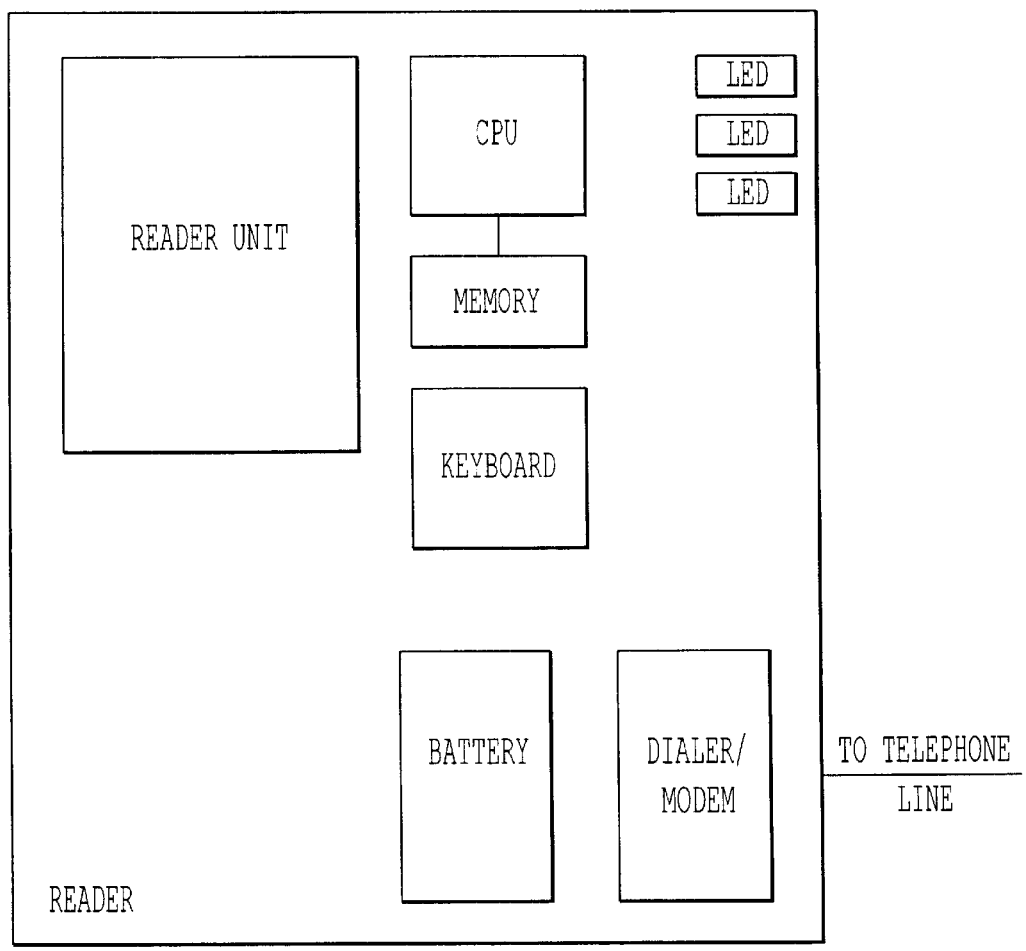

The invention will now be described in detail with reference to the subsequent drawings, in which:

FIG. 1 is a block diagram of the arrangement according to the invention connected to a telephone system, FIG. 2 is a block diagram of an alternative coupling of the arrangement according to the invention; and FIG. 3 is a block diagram of the intervals of the smart card reader according to the invention.

DETAILED DESCRIPTION OF THE PREFERRED EMBODIMENTS OF THE INVENTION

FIG. 1 shows the arrangement according to the invention coupled to a telephone system. The arrangement is located at the subscriber who is a service purchaser. A connection can be coupled via a telephone system, for example the general telephone network, to a service provider, one of which is shown. At the service provider station, a computer and communication equipment are located.

The arrangement according to the invention consists of a card reader for smart cards. The reader is connected in parallel with the telephone to a normal telephone jack via a standard adaptor plug. The reader contains a reader unit which, together with software functions, can handle smart cards. The reader can communicate with the receiver at the service provider station either by means of tone dialling signalling and/or by means of a modem. It also has a built-in keyboard for feeding in data. The reader is completely controlled from the telephone service which the user is calling. The computer equipment of the telephone service normally has a voice answering equipment or other equipment intended for communicating with a reader. The. reader is controlled via any one of the two communication channels which are accessible, by means of tone dialling signalling or modem.

FIG. 2 shows an alternative way for connecting the reader. The reader is here directly connected via its plug to the telephone network and the telephone set is coupled directly to the card reader. Here, too, the reader and the telephone set are coupled in parallel.

It is also possible to build the telephone set and the card reader together to form one unit. In this case, the unit has only one key set and a slot for introducing the smart card.

The reader is controlled by a central processing unit. This is an eight-bit central processing unit designed for maximum integration of the card reader's functions directly in the central processing unit. The central processing unit is made in CMOS technology which ensures low current consumption. Internally, there is a random-access memory RAM with 256 bytes which is adequate for the functions to be carried out by the reader. The program code can be stored in a programmable read-only memory PROM or mask-programmed directly in the central processing unit for minimising current consumption and price.

The card reader is equipped with a built-in keyboard which contains 12 keys: the digits 0–9 and characters * and #. The appearance corresponds to key sets of normal telephones. The keyboard is directly coupled to the central processing unit which eliminates the risk of leakage of information fed in.

The reader unit itself is designed for being mounted directly on the circuit board which is important for keeping down the total size and price of the construction. The reader unit is adapted to be able to handle all smart cards on the market. The reader unit is completely passive and is only a link between the card and the central processing unit. The central processing unit can communicate with the card via the reader unit and contribute power supply and clock. Different feed voltage and clock frequencies are supplied to the card depending on which card is connected.

The basic communication with the computer equipment called occurs with the aid of tone dialling signalling. The reader is equipped both with tone dialling transmitter and receiver.

The transmission speed is normally 10 characters (10×4 bits) per second. The tone dialling receiver is coupled in parallel with the normal telephone traffic which means that it can receive data both from the user's telephone and from the telephone network. The reader also contains a relay for disconnecting the user when the reader and the service provider s equipment are directly communicating with one another.

Since tone dialling signalling greatly limits the amount of data which can be transferred, the reader is also equipped with a built-in modem. The modem can handle communication according to CCITT V.21 and V.23 which provides a transmission speed of up to 1200 bps. This gives higher flexibility with respect to the functions to be executed by the reader.

The reader is also provided with a number of light-emitting diodes in different colours, the functions of which are described below.

The reader is built up of low-current components but the component with the highest current demand is the smart card. Since different cards are being used, the current consumption cannot be calculated accurately. Moreover, the cards draw more current when they are being written on, so the current consumption varies with time.

The power supply is provided by a battery or by a battery eliminator. A 9-V alkaline battery supplies continuous drive for the reader for approximately 3–4 hours. One of the abovementioned light-emitting diodes indicates low battery voltage and need for exchanging the battery.

When a card is inserted into the reader unit of the reader, the reader automatically starts. When the card is pulled out, the reader is shut down. Since smart cards are dependent on the power supply from the reader, they are returned to rest position when they are pulled out of the reading unit. When the reader is started by inserting a card into the reader unit, a yellow light-emitting diode is illuminated. The reader tests the card in order to identify the type of smart card which is being used. If the card is recognised, the yellow light-emitting diode is extinguished and the reader is ready for use. This means that the reader proceeds to listen to tone signals which are sent from the called system. If the reader does not recognise the card as one of the acknowledged types, the card is either of an unknown type or misused. A red light-emitting diode is then illuminated and the reader waits for the card to be pulled out. All calls to the reader then only produce an error message as response.

The user can feed data in locally to the reader with the aid of the keyboard. The information items fed in can then be used as data for an instruction to the card. The most usual type of information fed in is a personal code which will be tested in the card but it can also be another type of data, for example information to be encrypted. None of the operations at the keyboard will be output in plain text on the telephone line. The reader accepts the input from the keyboard after an instruction from the called system. When this happens, a green light-emitting diode is illuminated in order to indicate that the data will be fed in. The input is concluded with "#" and the green light-emitting diode is extinguished. When the light-emitting diode is extinguished, no operations at the keyboard will be stored or sent out on the line.

In the connected condition, the reader continuously listens to the data in the form of tone signals or via the modem, which are sent from the called system. When a start character is detected, the reader interprets this as a start of an instruction. The telephone is then disconnected from the line and the reader changes into instruction mode. The reader now collects all data including the signal "#", which indicates the end of the instruction. If a holdup of more than one second occurs between the different characters, the instruction is considered to be disturbed and the reader goes back to looking for the start character. When the entire instruction is received, it is decoded and executed. After the executed instruction, the reader always sends back a response. After that, the telephone is connected again to the line and the reader goes back to listening. When the modem is connected, the user is always disconnected from the line. From the moment the reader has detected the start character to the time when the reader has sent out the complete response, the yellow light-emitting diode is lit.

The reader always starts in tone dialling mode, that is to say it listens for tone dialling signals from the called system. An instruction can be used for changing communication channel and instead coupling in the modem. Thus, a number of different operating conditions are obtained: tone dialling signalling and signalling by means of the modem with different transmission speeds. The operating condition of the modem can be changed while modem traffic is in progress by means of a new instruction on the modem line. This provides, for example, the possibility of switching between 1200/75 bps as transmission speed. The response to the instruction is always given on the communication channel on which the instruction is sent, tone dialling or modem. Only after the response has been sent out does the exchange of communication channel or operating condition of the modem occur.

The reader can be commanded to accept data from the user via the keyboard by sending an instruction. The green light-emitting diode is illuminated in order to indicate that there will be input from the keyboard. The inputting is concluded by the user pressing the # character. The green light-emitting diode is extinguished when inputting is concluded. The user has a maximum of 30 seconds for feeding in data. If inputting is not concluded within this time, an error code is returned instead. This instruction is normally used for accepting the personal identification code which is to be used for opening the connected card.

An instruction can be directly sent to the connected card. The reader waits for a response from the card and then sends this back. The reader waits for the response for a maximum of 30 seconds. After that, an error code is returned instead. The reader only examines the length of the instruction as a check that a sufficient amount of data has been sent over. Otherwise, there is no check of the instruction. It is the task of the calling system to see that the instruction follows the specification for the connected card.

If data have been fed in from the keyboard, they can be transmitted to the connected card by means of a special instruction. The input data are stored in the keyboard buffer and transmitted to the card together with the instruction. Here, too, only the length of the data in the keyboard buffer is checked.

EXAMPLE

The arrangement according to the invention can be used for obtaining bank services. The service provider station is therefore the computer equipment of a bank for checking different accounts. The service purchaser is an account owner who has been allocated a smart bank card. To use the card, the user first calls up the bank via the telephone set and feeds the card into the card reader. When communication has been established, the computer equipment senses what the card is and what account is accessible. The user confirms his authorization by feeding in his personal identification code which is usually secret. The user can then obtain information on various accounts, carry out transactions and obtain other services by inputting requested information by means of the keyboard. At the same time, the computer equipment and the smart card automatically interact for transmitting information.

The card reader can be based at the account owner's home. It is also conceivable that the card reader is generally accessible, for example at post offices and banks. After each transaction, the user can be requested to sign the transaction by inputting a further code.

The arrangement according to the invention can also be used for obtaining services from a pharmacy. The card can then be programmed with a prescription, medical status or the like on a visit to the hospital or to the doctor. The card can also specify the amount of medicine which is dispensed within a certain time. The card user can use the card for ringing in prescription orders to the pharmacy. The card and the computer equipment at the pharmacy then interact so that the correct medicine is dispensed. The card keeps track of how much medicine is dispensed and within what time.

The arrangement according to the invention can also be used as means for payment for purchases by telephone. A video film hire shop, for example, can sell cards which have been programmed with a certain number of films in the form of units which are counted down with each purchase or hire. The smart card then has the function of a credit card or payment card.

Other embodiments of the invention are apparent to an expert in the field. The invention is only limited by the patent claims following.

What is claimed is:

1. A telecommunications system for remotely controlling a smart card in a smart card reader, the system comprising:
   a smart card reader for connecting to and reading the smart card;
   input means connected to the smart card reader for inputting data from a user to the smart card in the smart card reader;
   a telephone system; and
   a service provider for sending an instruction to the smart card reader to remotely control, across the telephone system, reading from the smart card and writing to the smart card by the smart card reader.

2. The system according to claim 1, wherein the smart card reader further comprises:
   means for reading a response from the smart card; and
   means for sending the response and from the smart card to the service provider.

3. The system according to claim 2, wherein the smart card reader further comprises:
   decoder for decoding that the instruction from the service provider indicates that data from the user is to be read from the input means;
   means for waiting until data from the user has been read from the input means; and
   means for sending the read data to the smart card.

4. The system according to claim 3, wherein the smart card comprises means for encrypting the response being sent to the service provider.

5. The system of claim 1, further comprising:
   element for dialing a telephone number of the service provider, the means for dialing connected to the smart card reader.

6. The system of claim 1, wherein the communication element comprises a modem.

7. The system of claim 1, wherein the communication element comprises means for communicating between the smart card reader and the service provider using tone signals.

8. The system of claim 1, wherein the input means comprises:
   means for indicating that the smart card reader is waiting for user-input.

9. The system of claim 8, wherein the means for indicating comprises a light emitting diode.

10. The system of claim 1, wherein the input means comprises means for indicating that the smart card reader will not accept user input.

11. The system of claim 10, wherein the means for indicating comprises a light emitting diode.

12. The system of claim 1, wherein the service provider comprises means for passing voice messages to the user of the smart card reader.

13. The system of claim 1, wherein the service provider comprises means for indicating the end of the instruction sent to the smart card reader.

14. The system of claim 1, wherein the smart card reader further comprises means for indicating the end of the response to be sent to the service provider.

15. The system of claim 1, wherein the smart card reader further comprises a CPU.

16. The system of claim 1, wherein the smart card reader further comprises a CPU for providing power and clock signals to the smart card.

17. The system of claim 1, wherein the smart card reader further comprises a battery.

18. The system of claim 17, wherein the smart card further comprises an LED for indicating a low battery voltage.

19. The system of claim 1, wherein the smart card reader further comprises means for determining a type of the smart card.

20. The system according to claim 1, wherein the smart card comprises:
   means for storing a number of pre-purchased units; and
   means for decrementing the number of pre-purchased units stored in said means for storing when requested by the service provider.

21. The system as claimed in claim 1, wherein the telephone system is connected to the smart card reader and the service provider for providing communications between the smart card reader and the service provider, the communications including a response being returned from the smart card reader to the service provider.

22. A method of providing services to a smart card in a remotely controllable smart card reader, the method comprising the steps of:
   receiving a call, across a telephone system, from a remote smart card reader; and
   sending an instruction across the telephone system to the smart card reader to remotely control reading from and writing to the smart card.

23. The method as claimed in claim 22, further comprising the steps of:
   waiting for input to be returned from the smart card reader; and
   receiving the input returned from the smart card reader.

* * * * *